United States Patent
French

[11] 3,865,425
[45] Feb. 11, 1975

[54] PET TRAILER
[76] Inventor: Marie M. French, 14521 Southwest 65th Ave., Miami, Fla. 33158
[22] Filed: Dec. 4, 1973
[21] Appl. No.: 421,590

[52] U.S. Cl. .............................. 296/24 C, 119/19
[51] Int. Cl. ............................................. B60r 27/00
[58] Field of Search ............... 296/24 C, 1 R, 24 R; 119/19, 18

[56] References Cited
UNITED STATES PATENTS

| 980,789 | 1/1911 | Jeffery | 296/24 C |
|---|---|---|---|
| 1,455,105 | 5/1923 | Butcher | 119/19 |
| 2,825,301 | 3/1958 | Quist | 296/24 C |
| 2,897,781 | 8/1959 | Olson | 119/19 |
| 3,234,908 | 2/1966 | Doskocil | 119/19 |
| 3,389,670 | 6/1968 | Caple | 296/24 R |
| 3,492,042 | 1/1970 | Nachtigall, Jr. | 296/24 R |

FOREIGN PATENTS OR APPLICATIONS

| 688,171 | 2/1953 | Great Britain | 296/24 C |
|---|---|---|---|

Primary Examiner—Albert J. Makay
Assistant Examiner—Donald W. Underwood
Attorney, Agent, or Firm—Marden S. Gordon

[57] ABSTRACT

A trailer intended for towing behind vehicles, such as automobiles, and adapted for the safe and comfortable carrying of pets therein, such as dogs, cats and the like, and having a protective compartment interior of the trailer permitting movement of the pet during transportation, the compartment being adequately ventilated and providing viewing ports for the pet to view the surrounding area, and water and feeding dishes conveniently located in the trailer compartment for the convenience of the pet. In addition, the door of the trailer opening into the trailer compartment forms a ramp permitting ease of ingress and egress of the pet. Further, to permit the trailer to be used with two or more pets there is provided a divider for dividing the trailer compartment into separate chambers such that each pet may have their own respective living quarters while being towed in the trailer.

1 Claim, 5 Drawing Figures

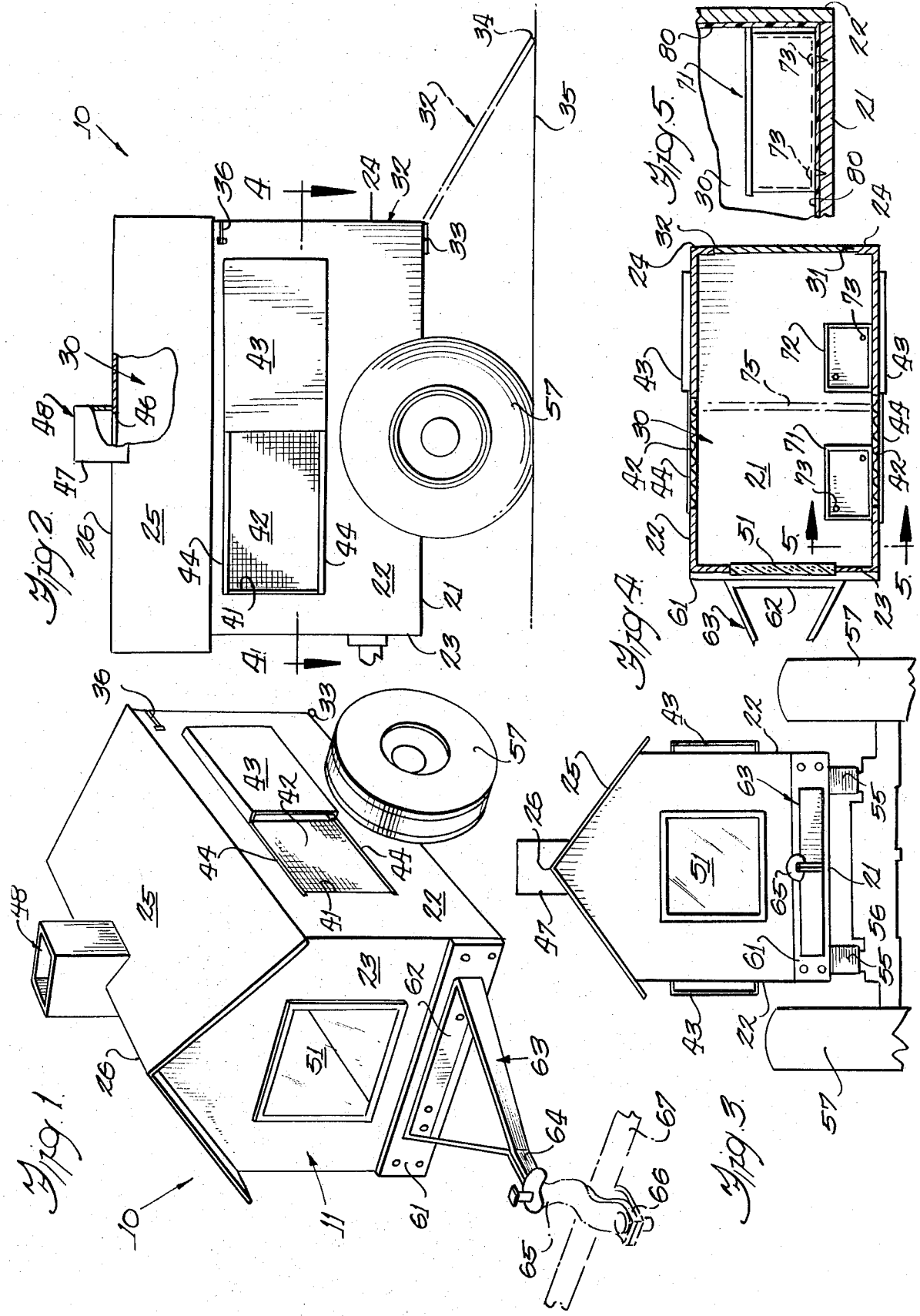

PET TRAILER

BACKGROUND OF THE INVENTION

1. Field of the Invention

This invention relates generally to pet carriers and more particularly to a novel trailer adapted to be towed behind an automobile and having a compartment therein for the transporting of pets between different locations and with the trailer being provided with all conveniences for the pet to provide comfortable living and traveling quarters for the pet.

2. Description of the Prior Art

The ownership of pets by individuals, such as dogs, cats, and the like, is constantly increasing among the populace with such pet owners desiring to take their pets along when traveling in the car, especially for traveling for long periods of time such as when going on vacations and the like. At such times, it is required that the pet ride inside the car which may make for an overcrowded car and, in the case of a dog, may result in the dangerous situation of the dog jumping around the car and the associated hazard of jumping into or jarring the driver in a manner to detract the driver from watching the road and thus cause an accident.

In the case of a cat, it is normal for such cat to be carried in a rather restrictive suitcase type carrying device, and when such cat is permitted to roam freely in the car there is a danger of distracting the driver to cause an accident, or the further danger of a cat jumping out of an open window resulting in injury or death to the cat.

Further, when traveling or transporting pets in a car, and when the individuals leave the car for any length of time, such as for eating or shopping purposes, it is usual to leave the pet locked in the car with the windows slightly opened in an attempt to provide ventilation for the pet. However, as well known, many pets have suffocated in cars with the windows partially opened due to the failure of proper ventilation by such windows and the car becoming overly hot due to being parked in the sun. Further, pets, when left alone in an automobile, have been known to injure themselves by becoming entangled in the steering wheel, brake pedal, gas pedal and the like as such pose hazards to a playful pet left alone in the automobile.

SUMMARY OF THE INVENTION

The present invention recognizes the plight of pet owners and provides a novel transporting device for pets in the form of a pet trailer adapted to be hitched to the back of an automobile and providing the pet with safe and comfortable temporary living quarters.

It is a feature of the present invention to provide a safe, comfortable and convenient trailer for transporting pets between locations.

A further feature of the present invention provides a trailer for transporting pets with the trailer being insulated against the weather to protect the pet and having windows therein providing for the visibility of the pet exteriorly of the container providing both for the pet owner to view the pet in the trailer as well as for the pet to view the surrounding area out of such windows.

Still a further feature of the present invention provides a trailer for transporting pets and which has selectively operable ventilating means for controlling the amount of ventilation passing through the trailer for the comfort and convenience of the pet.

Yet still a further feature of the present invention provides a trailer for transporting pets and which is readily dividable into two separate compartments for the transporting of two or more pets separate from each other to protect against fighting and the like between such pets.

Yet still a further feature of the present invention provides a trailer for transporting pets and providing a ramp type door to permit easy ingress and egress of the pet relative to the trailer.

The provision of a trailer for transporting pets and adapted to be hitched to an automobile, such as briefly outlined above, and possessing the stated advantages, constitutes the principal features of the present invention. The provision of a trailer which is relatively simple in its construction and which therefore may be readily manufactured at a relatively low cost and by simple manufacturing methods; one which is relatively devoid of moving parts and which therefore is unlikely to get out of order; one which is rugged and durable and which therefore may be guaranteed by the manufacturer to withstand many years of intended usage; one which is aesthetically pleasing and refined in appearance; one which is adaptable to be hitched behind automobiles of various makes and manufacturers; and one which, otherwise, is well adapted to perform the services required of it, are further desirable features which have been borne in mind in the production and development of the present invention.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a perspective view of a pet trailer constructed in accordance with the present invention;

FIG. 2 is a side elevational view of the pet trailer;

FIG. 3 is a front end elevational view of the trailer;

FIG. 4 is a cross-sectional view taken along Line 4—4 of FIG. 2; and

FIG. 5 is an enlarged cross-sectional view taken along Line 5—5 of FIG. 4.

DESCRIPTION OF THE PREFERRED EMBODIMENT

Referring now to the drawings in detail there is illustrated a preferred form of a trailer adapted for the carrying of pets, such as cats, dogs and the like, and which is designated in its entirety by the reference numeral 10. The trailer 10 may be manufactured out of metal, wood, hard rubber, plastic, or any combination of such materials or any other suitable satisfactory materials providing an aesthetically pleasing and refined appearance and having the required structural characteristics to provide a strong and durable construction.

The trailer 10 includes a housing 11 which is in the shape of a small house like member and which includes a flat horizontally extending rectangularly shaped bottom surface 21, a pair of opposed spaced apart vertically extending side wall members 22, a vertically extending front end wall surface 23, a vertically extending back wall surface 24, and a peaked roof member 25 having a peak edge 26 with the roof member overlying the top edges of the wall surfaces so as to enclose a pet carrying compartment 30 defined interiorly of such wall surfaces and roof member.

To provide ingress and egress of a pet into the compartment 30, the back end wall 24 has an opening 31 extending therethrough of a size and configuration to permit ease of accessibility to the compartment 30, the opening 31 being closed by a door 32 pivotally hinged to the bottom surface 21 by a horizontally extending hinge member 33 permitting swinging movement of the door thereabout between a closed position to close the compartment 30, and an open position where the top edge 34 of the door engages the ground 35 to define an inclined ramp leading from the compartment to the ground for ease of ingress and egress to the compartment by the pet. To retain the door 32 in the closed position there is provided at opposite side edges thereof a latch type locking device 36 adapted to engage each of the side wall members adjacent the back end wall portion thereof near the roof member 25 thereof.

To provide ventilation to the compartment 30 each of the side wall members 22 is provided with an elongated rectangularly shaped opening 41 protected by a screen mesh 42, the area of the opening being selectively variable by use of a door 43 of a rectangular size and configuration to completely close the opening and which is slidably mounted relative to the opening along tracks 44 between a fully closed position where the door overlaps the complete opening and seals the same against the weather, and a fully open position where the door is slid longitudinally rearwardly of the opening to expose the full opening to the weather.

To assist in ventilating the compartment 30, the peak edge 26 of roof 25 is provided with an opening 46 extending completely therethrough, the opening being camouflaged by a chimney like member 47 which is mounted to the roof member 25 and extends upwardly therefrom to define a passageway 48 therebetween in communication with opening 46 to permit ventilation of compartment 30.

To provide visibility of the pet in the compartment 30, a transparent window like member 51 is mounted on front end wall 23 so as to permit the pet to look outwardly therethrough to view the surrounding area, but more importantly, to permit the occupants of the vehicle to look out of the vehicle's back window through the window member 51 to maintain a convenient method of communication with the pet in the trailer.

The bottom surface 21 includes a pair of transversely spaced apart brackets 55 extending downwardly therefrom and to which there is secured in any conventional manner an axle assembly 56 having the ends thereof extending transversely outwardly of the side wall surfaces 22 and having a wheel 57 rotatably mounted on each axle and in the conventional manner.

Extending transversely along the bottom portion of front end wall 23 adjacent bottom surface 21 is an elongated rectangular brace 61 having one end 62 of a triangular shaped towing bracket 63 connected thereto with the apex 64 of the towing bracket having a ball socket 65 connected thereto and adapted to be detachably attached to a towing bracket 66 of the conventional type mounted on a frame member 67 of the towing vehicle.

Disposed interior of compartment 30 and mounted on the bottom surface 21 are a pair of spaced apart receptacles 71 and 72 each adapted to have feed and water placed thereinto for the pet, the receptacles being fastened by screws 73 to the bottom surface 21.

For dividing the compartment 30 into two separate chambers for the carrying of two pets simultaneously while yet separating the pets from each other, a removable divider 75 is provided adapted to divide the compartment substantially in half with receptable 71 in one half and receptacle 72 in the other half so that feed and water may be supplied to each pet carried in each half of the compartment 30.

For ease of cleanability, it is preferable that the interior surfaces of the compartment 30 have a waterproof vinyl or plastic lining member 80 disposed on the interior bottom surface 21, wall surfaces 22–24, and the interior of roof member 25, such lining member being provided either in the form of a separate member fastened to said interior surfaces, such as by screws, bolts, or suitable adhesives, or alternatively, may be sprayed onto such interior surfaces to form an integral part thereof.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. A trailer intended to be towed behind vehicles, such as automobiles and the like, and adapted for the transportation of pets in safety and convenience from point to point, comprising in combination:

a body member in the general shape and configuration of a house including a substantially flat rectangular horizontally extending bottom surface, a pair of opposed transversely spaced apart vertically extending side wall members, a vertically extending front end wall member, a vertically extending back end wall member spaced longitudinally from the front end wall member and extending parallel thereto, and a peaked roof member mounted to the top edges of said wall members;

a compartment defined interiorly of the wall members and bottom surface and roof member;

a smooth non-porous waterproof lining member disposed interiorly of the surfaces defining the compartment in juxtaposition with said surfaces;

an opening in the back end wall member of a size and configuration to permit ease of ingress and egress of a pet to the compartment;

a door pivotally mounted on the back end wall along the bottom edge thereof and movable between a first position closing the back end wall opening and a second position defining an inclined ramp extending outwardly and downwardly from the back end wall forming a runway for the pet to gain access to the compartment;

latch means associated with the door for detachably securing the door in the closed position;

a ventilating opening extending through the roof member communicating the compartment with the surrounding atmosphere;

a hollow chimney shaped rectangular member having one end mounted to the roof member about the ventilating opening formed therein with the opposite end projecting upwardly therefrom and defining a passageway therebetween in communication with said ventilating opening to permit air flow into and out of the compartment;

a rectangularly shaped elongated window like opening disposed in one of the side wall members and extending horizontally therethrough between the opposite end edges thereof;

a rectangularly shaped screen forming mesh overlying the side wall opening with the perimeters of the mesh fixedly mounted to the perimeters of the opening to prevent a pet from passing therethrough while permitting free ventilation of the compartment; a pair of vertically spaced apart horizontally extending track members disposed on opposite top and bottom edges of the side wall opening and extending therealong;

a cover member associated with the side wall opening and selectively movable between the limits of a first position fully closing and covering the side wall opening and a second position fully opening the side wall opening;

the cover member being of an elongated rectangular shape of a size greater than the size of the rectangular opening and having opposed horizontally extending side edges and opposed vertically extending end edges, the side edges adapted to be slidingly engaged in the respective track members for axial sliding movement therealong, the cover member selectively adjustable to overlap various areas of the opening to provide a selectable degree of ventilation to the compartment;

a transparent window like member disposed in the front end wall providing visibility of the compartment from exterior of the body member;

a pair of receptacles adapted for containing food and water for a pet with each consisting of an open topped box-like container having a bottom surface and depending surrounding side wall surfaces with each disposed in the compartment, each of the bottom surfaces having at least one aperture extending therethrough;

a plurality of fastening means each extending through an associated aperture and engaging the body member bottom surface to secure the associated receptacle in a fixed position on the bottom surface of the compartment;

a substantially flat divider member adapted to be vertically removably inserted into the compartment extending between the side wall members thereof to separate the compartment into two tandemly disposed chambers, each of the chambers having disposed therein one of the receptacles adapted for containing food and water therein;

a pair of brackets transversely spaced apart and extending downwardly from the body member bottom surface;

an axle assembly mounted to said brackets with the ends of the axle assembly extending transversely outwardly of the planes defined by the respective side wall members;

a pair of wheels with each wheel mounted on opposite ends of the axle assembly to provide a rolling support for the body member;

a first rectangularly shaped member extending transversely of the front end wall adjacent the bottom surface thereof and mounted thereto;

a triangularly shaped member having one leg thereof extending transversely of the first member centrally thereof and fastened thereto, the apex of the triangular member projecting outwardly furthest from the front end wall; and a socket affixed to the apex adapted to be detachably hitched to a towing bracket secured to a towing vehicle, such as an automobile and the like.

* * * * *